Nov. 7, 1967

F. J. HORLANDER 3,351,777

AUTOMATIC PULSE FORMER

Filed June 8, 1964

INVENTOR.
FRANK L. HORLANDER
BY
ATTYS.

INVENTOR.
FRANK L. HORLANDER

ATTYS.

United States Patent Office 3,351,777
Patented Nov. 7, 1967

3,351,777
AUTOMATIC PULSE FORMER
Frank J. Horlander, Lexington, Ky., assignor, by mesne assignments, to the United States of America as represented by the Secretary of the Navy
Filed June 8, 1964, Ser. No. 373,590
14 Claims. (Cl. 307—88.5)

ABSTRACT OF THE DISCLOSURE

The transistor circuits are provided with means which assure that they conduct for an accurately controlled time interval producing pulses of precise height and width.

---

The present invention relates to pulse formers and more particularly to an automatic pulse former and distribution amplifier for clock pulses having accurately controlled amplitudes and durations.

Clock pulse generators have been utilized in the prior art as components in computor systems, communication systems and timing systems. In some of the prior art systems, the clock pulses deteriorate because of the relatively long electrical distance that the clock pulses must travel in the system. In addition stray electrical effects due to the inductance inherent in the transmission system or the stray capacitance between elements either dissipates the pulses or alternatively changes the shape of the clock pulses. The deteriorated clock pulses cause errors by failing to operate the gating systems which require clock pulses or alternatively the clock pulses may hold the respective gates on for too long a period of time in aforementioned systems. The above mentioned difficulties are overcome by the present invention which accepts the deteriorated pulses and reforms the clock pulses. The reformed pulses have an accurate predetermined pulse height, and duration.

An object of the present invention is to provide a pulse former for reforming deteriorated clock pulses into clock pulses having an accurate predetermined height.

Another object of the present invention is to provide a pulse former for reforming deteriorated clock pulses into pulses having an accurate predetermined duration.

A further object of the present invention is to provide apparatus for the automatic restoration of deteriorated clock pulses at remote points.

Still another object of the present invention is to provide a pulse reformer for reforming deteriorated clock pulses into clock pulses having a particular predetermined time relationship to the deteriorated clock pulses.

Other objects and many of the attendant advantages of this invention will be readily appreciated as the same becomes better understood by reference to the following detailed description when considered in connection with the accompanying drawings wherein.

Figure 1:
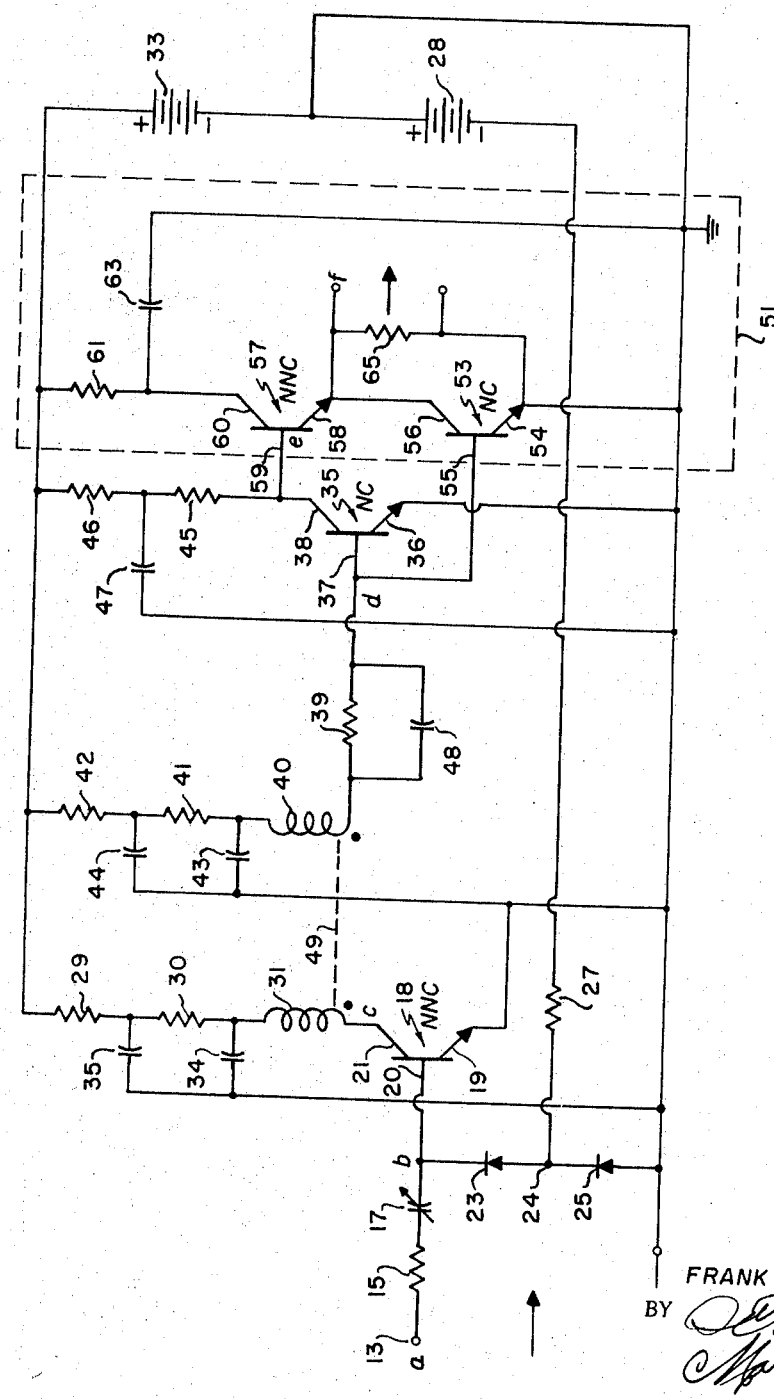
FIG. 1 is a circuit diagram of a pulse former embodying the present invention.

Referring to FIG. 1 an input terminal 13 is connected to the series combination of a resistor 15 and a variable capacitor 17 forming a network for controlling the duration of the reformed pulse. An amplifying and pulse shaping NPN transistor 18 has an emitter electrode 19, base electrode 20 and collector electrode 21. The free end of variable capacitor 17 is connected to the base electrode 20 of transistor 18. The emitter electrode 19 of transistor 18 is connected to ground. A diode biasing network comprising a first diode 23 connected in series with a second diode 25 has the cathode of diode 23 connected to the base electrode 20 of transistor 18. The anode of diode 23 is connected to the junction point 24 and the cathode of diode 25 is also connected to the junction point 24. The anode of diode 25 is connected to ground. A resistor 27 connects the negative terminal of battery 28 to the junction point 24. A first resistor 29 is connected in series with a second resistor and the primary winding 31 of a transformer. The free end of the primary winding is connected to the collector electrode 21 of transistor 18 and the free end of resistor 29 is connected to the positive terminal of battery 33 which has its negative terminal connected to ground. The positive terminal of battery 28 is also connected to ground. By-pass capacitor 34 connects the junction of resistor 30 and the primary winding 31 to ground. By-pass capacitor 35 connects the junction of resistor 29 and resistor 31 to ground.

An NPN inverter transistor 35 having an emitter electrode 36, a base electrode 37 and a collector electrode 38 has its emitter electrode 36 connected to ground. One end of a secondary winding 40 of the transformer is connected to the base electrode 37 of transistor 35 through the parallel combination of capacitor 38 and resistor 39. The other end of the secondary winding 40 is connected through resistors 41 and 42 to the positive terminal of batery 33. A by-pass capacitor 43 connects the junction of the secondary winding 40 of the transformer and resistor 41 to ground. A by-pass capacitor 44 connects the junction of resistor 41 and resistor 42 to ground. The collector electrode 38 of transistor 35 is connected to the positive electrode of battery 33 by resisors 45 and 46 connected in series. The junction of resistors 45 and 46 is connected to ground by by-pass capacitor 47.

A power output stage 51 contains a first NPN output transistor 53 having an emitter electrode 54, a base electrode 55 and a collector electrode 56 and a second output transistor 57 having an emitter electrode 58, a base electrode 59 and a collector electrode 60. The emitter electrode of transistor 53 is connected to ground and the base electrode 55 of transistor 53 is connected to the base electrode 37 of transistor 35. The collector electrode 56 of transistor 53 is connected to the emitter electrode 58 of transistor 57, and its base electrode 59 is connected to the collector electrode 38 of transistor 35. The collector electrode 60 of transistor 57 is connected by resistor 61 to the positive terminal of battery 33. A by-pass capacitor 63 couples the collector electrode 60 of transistor 57 to ground. A load resistor 65 is connected between the emitter electrode 54 of transistor 53 and the emitter electrode 58 of transistor 57.

Figure 4:
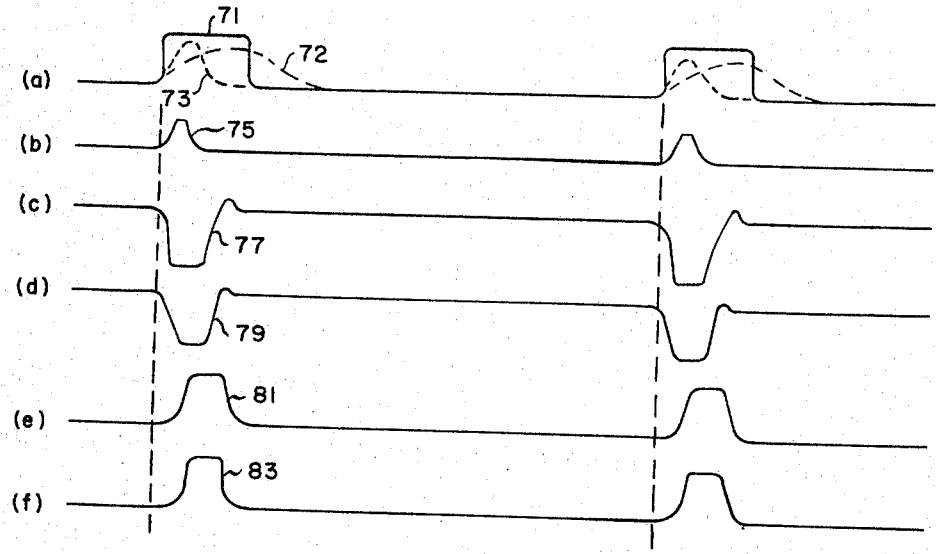
FIG. 4 illustrates the voltages appearing at preselected points of the circuit diagram of FIG. 1.

The operation of FIG. 1 will be discussed with reference to FIG. 4 which illustrates the pulses present at various points of the circuit of FIG. 1. The input pulse arriving at terminal 13 may have the shape illustrated as pulses 71, 72, 73 or any variation thereof. The adjustment of the variable capacitor determines the width of the pulse 75 supplied to the base electrode 20 of transistor 18 for driving transistor 18 into saturation. Negative input pulses tend to continue the forward bias on diodes 23 and 25 while positive input pulses tend to bias diodes 23 and 25 off. The positive pulses make transistor 18 conductive driving it into saturation. The output pulse 77 of amplifier transistor 18 is coupled to the base electrode 37 of normally on transistor 35 by the transformer 34 for turning transistor 35 off. The shape of the pulse arriving at the base electrode 37 of transistor 35 is illustrated as pulse 79 in FIG. 4. Transistor 35 functions as a hold off inverter stage because transistor 57 is held off as long as transistor 35 is conductive. Pulse 79 turns transistor 35 off producing a positive going pulse 81 for turning transistor 57 on producing a reformed output clock pulse 83. Transistor 53 is normally on shorting out the load resistor 65. The pulse 79 is supplied to the base electrode 55 of transistor 53 thereby simultaneously turning transistor 53 and transistor 35 off and eliminating the short across the load resistor 65 when the output pulse is produced.

Figure 2:
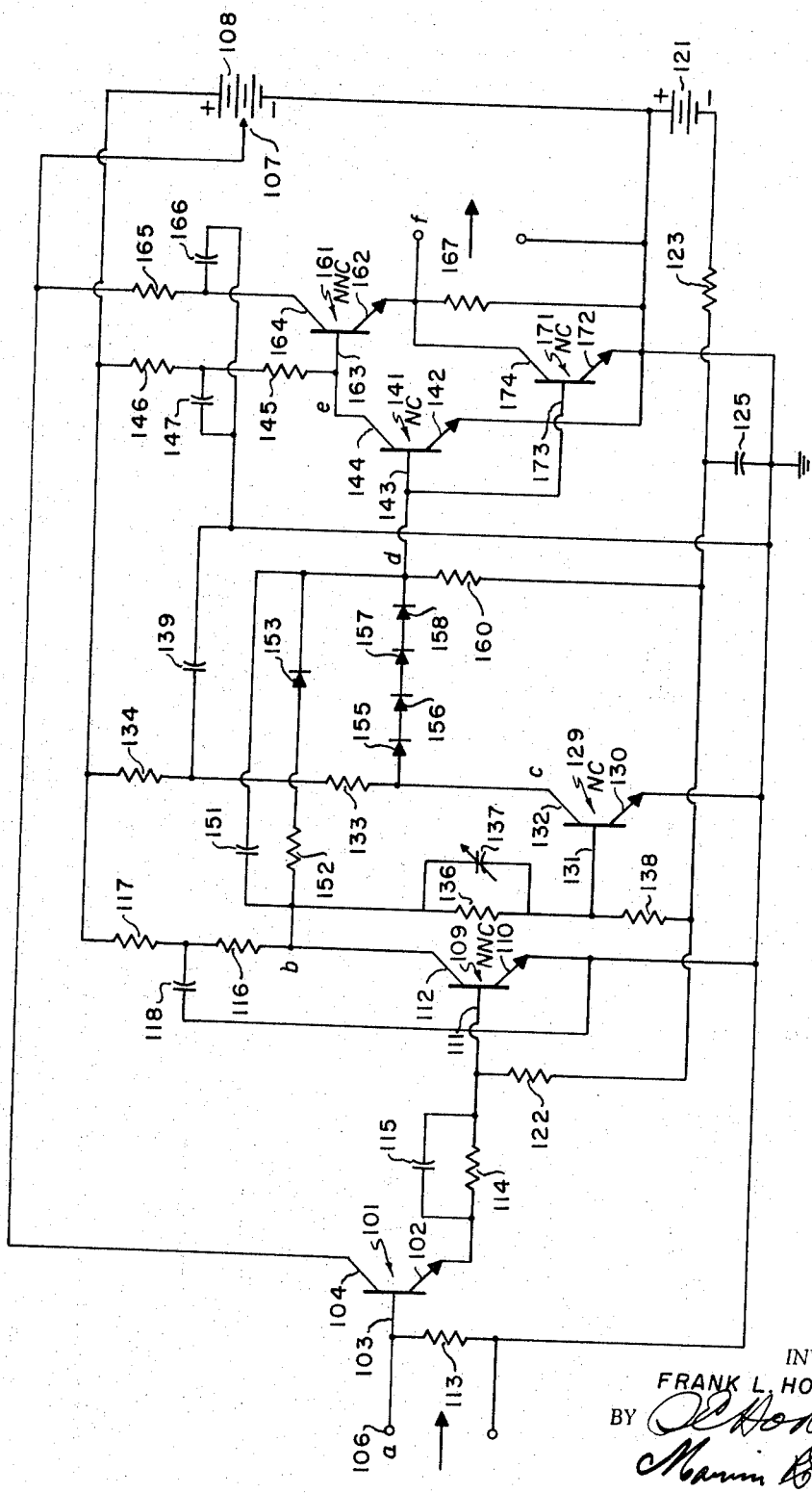
FIG. 2 is a circuit diagram of another pulse former embodying the present invention.

Referring to FIG. 2 an NPN emitter follower transistor 101 having an emitter electrode 102, a base electrode 103 and a collector electrode 104, has its base electrode 105 connected to the input terminal 106. The collector electrode 104 of transistor 103 is connected to the center tap 107 of battery 108. A resistor 113 connects the base electrode 103 of transistor 101 to ground. An NPN inverter transistor 109 having an emitter electrode 110, a base electrode 111 and a collector electrode 112 has its emitter electrode connected to ground. The base electrode 111 of transistor 109 is connected through the parallel resistor 114 and capacitor 115 to the emitter electrode of the emitter follower transistor 101. The collector electrode 112 of transistor 109 is connected to the positive terminal of battery 108 by resistors 116 and 117 connected in series.

The junction of resistors 116 and 117 is connected to ground by capacitor 118. The base electrode 111 of transistor 109 is connected to the negative terminal of battery 121 by resistors 122 and 123 connected in series. The negative terminal of battery 108 is connected to the positive terminal of battery 121. The junction of resistors 122 and 123 is connected to ground by capacitor 125.

An NPN transistor 129 having an emitter electrode 130, base electrode 131 and a collector electrode 132 is connected to the positive terminal of battery 108 by resistors 133 and 134 connected in series. Capacitor 139 connects the junction of resistors 133 and 134 to ground. The emitter electrode 130 of transistor 129 is directly connected to ground and the base electrode 131 of transistor 129 is connected by resistors 138 and 123 to the negative terminal of battery 121. The base electrode 131 of transistor 129 is connected through the parallel combination of resistor 136 and capacitor 137 to the collector electrode 112 of transistor 109. The capacitance of capacitor 137 determines the amount of time delay imparted to the pulse coupled to the base electrode 131 of transistor 129 from the collector electrode 112 of transistor 109. A hold off NPN inverter transistor 141 having an emitter electrode 142, a base electrode 143 and a collector electrode 144 connected to the positive terminal of battery 108 by resistors 145 and 146 connected in series. Capacitor 147 connects the junction of resistors 145 and 146 to ground. A capacitor 151 connected in parallel with the series combination of a resistor 152 and a diode 153 is connected between the collector 112 of transistor 109 and the base electrode 143 of transistor 141 forming part of a pulse shaping network to be hereafter described. The cathode of diode 153 is connected to the base electrode 143 of transistor 141. Diodes 155, 156, 157 and 158 are connected in series with the anode of one connected to cathode of the next one, and the cathode of diode 155 is connected to the collector electrode 132 of transistor 129. The anode of diode 158 is connected to the base electrode 143 of transistor 141. The base electrode 143 of transistor 141 is connected to the negative terminal of battery 121 by resistors 160 and 123 connected in series.

An NPN output amplifier transistor 161 having an emitter electrode 162, base electrode 163 and a collector electrode 164 is connected through resistor 165 to the center tap 107 of battery 108. The collector electrode 164 is connected by capacitor 166 to ground. The base electrode 163 of transistor 161 is connected to the collector electrode 144 of transistor 141. A second NPN power output transistor 171 having an emitter electrode 172, base electrode 173 and collector electrode 174 is connected to the emitter electrode 162 of transistor 161. The base electrode 173 of transistor 171 is connected to the base electrode 143 of transistor 141 and the emitter electrode 172 of transistor 171 is connected to ground. A load resistor 167 is connected between the collector electrode 174 of transistor 171 and the emitter electrode 172 of transistor 171.

Figure 5:
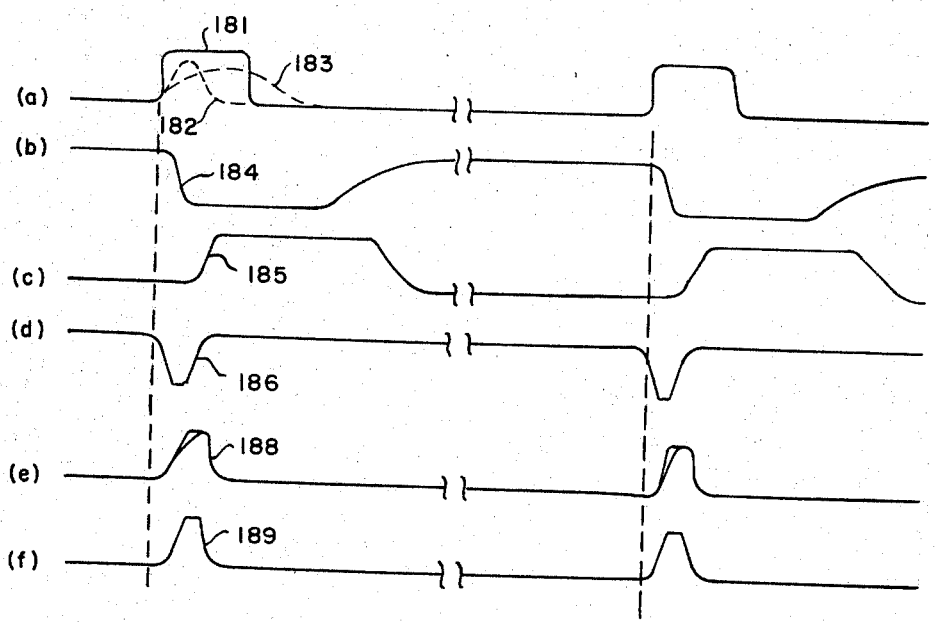
FIG. 5 illustrates the voltages appearing at preselected points of the circuit diagram of FIGS. 2 and 3.

The operation of FIG. 2 will be discussed with reference to FIG. 5 which illustrates the pulses present at various points of the circuits of FIG. 2. The input pulse arriving at input terminal 106 may have the shape illustrated as pulses 181, 182, 183 or any variations thereof. The positive input pulses, regardless of their shape causes transistor 101 to become conductive which in turn causes transistor 109 to be driven into saturation having an output pulse illustrated as pulse 184. The negative going output pulse 184 is transmitted by capacitor 151 to the base electrode 143 of transistor 141 cutting transistor 141 off. The negative going pulse 186 which is placed on the base electrode of transistor 143 is also placed on the base electrode 173 of transistor 171 causing transistor 171 to become non conductive. The positive output pulse 188 on the collector electrode 144 of transistor 141 causes transistor 161 to become conductive producing an output pulse 189 across resistor 167.

The negative going output pulse 184 is transmitted to the base electrode 131 of transistor 129 for cutting the transistor off. The parallel connected coupling resistor 136 and capacitor 137 delays the pulse slightly so that the negative going pulse 184 arrives at a slightly later time on the base electrode 131, as can be seen by observing the time relationship of pulses 184 and 185. Cutting off transistor 129 causes a positive going voltage to appear on the collector electrode 132 which is transmitted to the base electrode 143 of transistor 141 by diodes 155, 156, 157 and 158. The diodes 155, 156, 157 and 158 shorten the rise time of the positive going portion of the pulse which is applied on the base electrode 143 of transistor 141 for turning the transistor 141 back on. The negative output pulse produced by transistor 141 causes transistor 161 to become non conductive terminating the output pulse 189. The positive portion of the pulse applied to the base electrode 143 of transistor 141 is also applied to the base electrode 173 of transistor 171 causing transistor 171 to become conductive.

Figure 3:
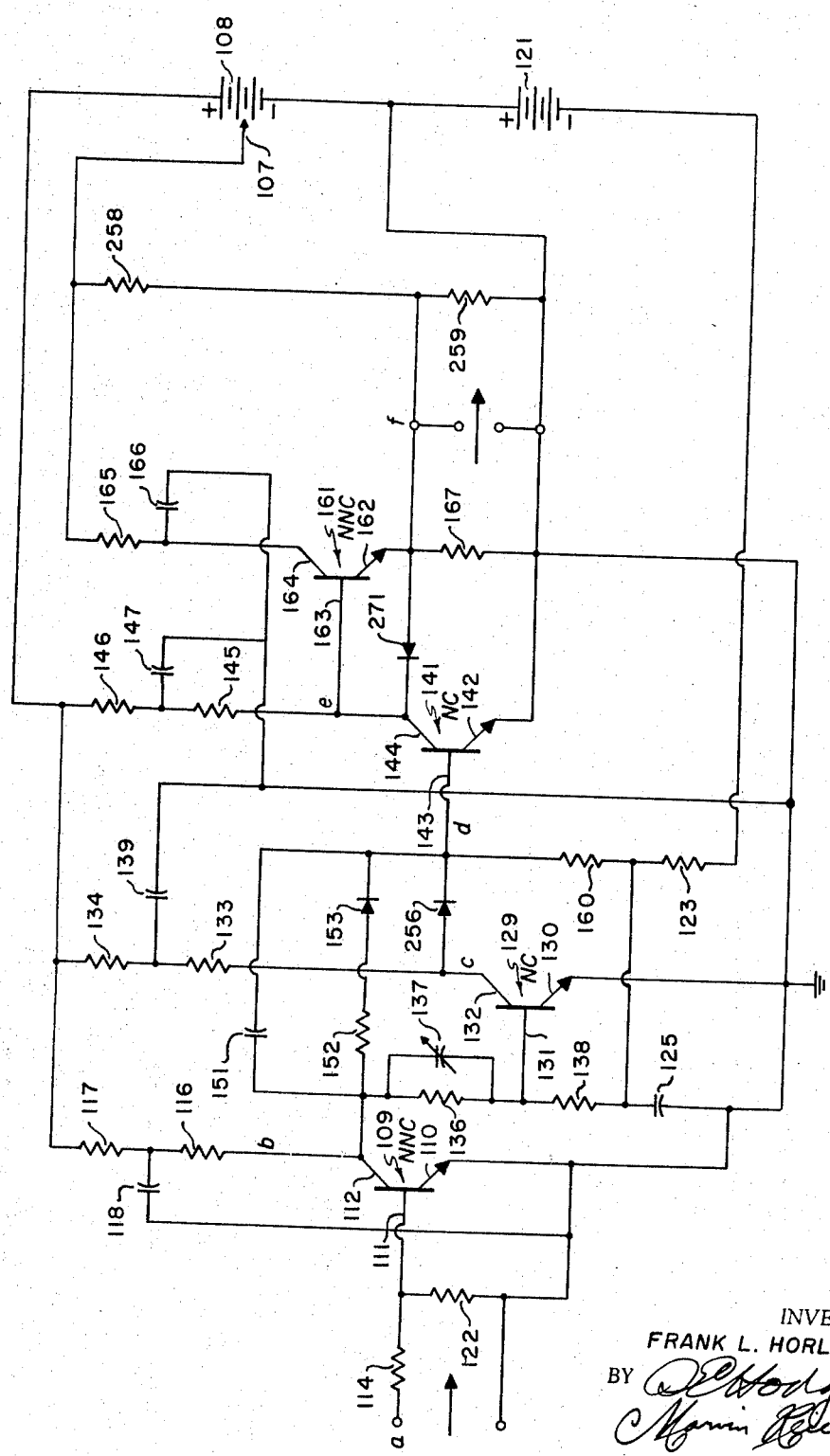
FIG. 3 is a circuit diagram of still another pulse former embodying the present invention.

Referring to FIG. 3 similar components performing similar functions as in FIG. 2 contain the same numerals as the respective components of FIG. 2 and therefore will not be repeated. A signal diode 256 has its anode connected to the collector electrode 132 of transistor 129 and its cathode connected to the base electrode 143 of transistor 141. A diode 271 has its anode connected to the emitter electrode 162 of transistor 161 and its cathode connected to the collector electrode 144 of transistor 141 replaces the transistor 171. A first resistor 258 is connected in series with a second resistor 259 for supplying a source of bias potential to the anode of diode 271 which is connected to the junction of resistors 258 and 259.

The operation of FIG. 3 is similar to the operation of FIG. 2. A positive going pulse 181 on the base electrode 111 of transistor 109 causes transistor 109 to be driven into saturation generating a negative going pulse 184. The negative going pulse 184 is transmitted to the base electrode 143 of transistor 141 by capacitor 151 cutting off the normally conductive transistor 141. Cutting off transistor 141 causes a positive pulse 188 to be produced on the collector electrode 144 of transistor 141 which biases diode 271 in its non conductive condition and the positive pulse 188 biases transistor 161 on producing an output pulse 189 across the load resistor 167.

The negative going pulse 184 is also applied to the base electrode 131 of transistor 129 through the parallel combination of resistor 136 and capacitor 137 for cutting transistor 129 off. The positive pulse 185 generated by cutting transistor 129 off is applied to the base electrode 143 of transistor 141 for returning transistor 141 to conduction which produces a negative going pulse on the collector electrode 144 of transistor 141. The negative going pulse is transmitted to the base electrode 163 of transistor 161 cutting transistor 161 off and terminating the output pulse 189. Under these conditions when there is no output pulse diode 271 is biased in its forward direction and transistor 141 is conducting placing the emitter electrode 162 of transistor 161 at substantially ground potential.

Obviously many modifications and variations of the present invention are possible in the light of the above teachings. It is therefore to be understood that within the scope of the appended claims the invention may be practiced other wise than as specifically described.

What is claimed is:

1. A pulse generator for reforming deteriorated clock pulses into pulses having an accurate predetermined height and duration comprising:
    a first electronic valve means for generating pulses of accurate predetermined height from input pulses of different heights having an input and an output;
    means for accurately determining the beginning and end of an output pulse from inputs pulses of various durations coupled to said first electronic valve means input;
    a second electronic valve means for gating an output pulse having an input; and
    third electronic valve means for latching said second electronic valve means off in absence of said accurately predetermined pulse having an output coupled to said input of said second electronic valve means;
    third input of said electronic valve means for latching said second electronic valve means off coupled to said electronic valve means for generating pulses whereby the second pulse of the output electronic valve means has an accurate predetermined pulse duration and height.

2. A pulse generator for reforming deteriorated clock pulses into pulses having an accurate predetermined height and duration as defined in claim 1 but further characterized by having said first electronic valve means for generating pulses comprising an NPN transistor.

3. A pulse generator for reforming deteriorated clock pulses into pulses having an accurate predetermined height and duration comprising:
    means for accurately determining the beginning and end of a pulse responsive to deteriorated clock pulses having an input for receiving deteriorated clock pulses;
    a saturable electronic valve means for generating a pulse of predetermined amplitude having an input and an output;
    means for driving said saturable electronic valve into saturation connected to said input of said saturable electronic valve means, said means for driving said saturable electronic valve into saturation comprising said means for accurately determining the beginning and end of a pulse;
    an output electronic valve means for gating an output pulse having an input; and
    electronic valve means for latching said output electronic valve off in absence of said accurately predetermined pulse having an output coupled to said input of said output electronic valve and an input coupled to said output of said saturable electronic valve means, whereby deteriorated clock pulses are reformed.

4. A pulse generator for reforming deteriorated clock pulses into pulses having an accurate predetermined height and duration as defined in claim 3 but further characterized by having said saturable electronic valve comprising an NPN transistor;
    said output electronic valve comprising an NPN transistor;
    said electronic valve means for latching said output electronics valve comprising an NPN transistor.

5. A pulse generator for reforming deteriorated clock pulses into pulses having an accurate predetermined height and duration as defined in claim 3 but further characterized by having said input of said electronic valve means for latching said output electronic valve off coupled to said saturable electronic valve by a transformer.

6. A pulse generator for reforming deteriorated clock pulses into pulses having an accurate predetermined height and duration comprising:
    an input terminal;
    a resistor and capacitor connected in series with the free end of the resistor connected to the input terminal;
    a first transistor having a base electrode, and a collector electrode, said base electrode connected to the free end of said capacitor;
    a source of potential;
    a transformer having a primary and secondary windings, said primary winding having one end connected to said collector electrode of said first transistor and the other end of said primary winding connected to said source of potential;
    a second transistor, having a base electrode, and a collector electrode, one end of said secondary winding connected to the base electrode of said second transistor;
    a third transistor having a base electrode, and a collector electrode, said base electrode of said third transistor coupled to the base electrode of said second transistor; and
    a fourth transistor having a base electrode, emitter electrode and collector electrode, said base electrode of said fourth transistor connected to the collector electrode of said second transistor, the emitter electrode of said fourth transistor connected to the collector electrode of said third transistor whereby the output pulses are taken from the collector electrode of said third transistor.

7. A pulse generator for reforming deteriorated clock pulses into pulses having an accurate predetermined height and duration comprising:
    a first electronic valve having an input for receiving pulses and an output;
    a second electronic valve having an input and an output;
    a means for extinguishing conduction of said second electronic valve connected between the output of said first electronic valve and the input of said second electronic valve; and
    a means for turning said second electronic valve on after a predetermined time interval connected between said output of said first electronic valve and said input of said second electronic valve whereby output pulses are generated having a predetermined width and height from deteriorated clock pulses.

8. A pulse generator for reforming pulses as defined in claim 7 but further characterized by having said means for extinguishing conduction of said second electronic valve comprising a capacitor for transmitting a negative pulse; and
    said means for turning said second electronic valve on after a predetermined time interval comprising parallel resistance capacitance network having one end connected to the output of said first valve, a third electronic valve having an input and an output, said input connected to said other end of said resistance capacitance network and a plurality of diodes connected between the output of said third electronic valve and the input of said second electronic valve.

9. A pulse generator for reforming pulses as defined in claim 8, but further characterized by said first electronic valve, said second electronic valve and said third electronic valve comprises transistor.

10. A pulse generator for reforming pulses as defined in claim 7 but further characterized by said first electronic valve, and said second electronic valve comprises transistor.

11. A pulse generator for reforming deteriorated clock pulses into pulses having an accurate predetermined height and duration comprising:
- a first saturable transistor having an input for receiving deteriorated clock pulses and an output;
- a second normally on transistor having an input and an output;
- a capacitor connected between the output of said first transistor and the input of said second transistor;
- a parallelly connected resistor and capacitor;
- a third transistor having an input and an output, said parallelly connected resistor and capacitor connected between said output of said first transistor and the input of said third transistor;
- a unilateral conducting means connected between said output of said third transistor and said input of said second transistor;
- a fourth transistor having a base electrode, and an emitter electrode, said base electrode of said fourth transistor connected to the output of said second transistor; and
- an output impedance connected to the emitter of said fourth transistor.

12. A pulse generator for reforming pulse as defined in claim 11 but further characterized by having an emitter follower transistor having an input and an output, said output of said emitter follower connected to the input of said first transistor.

13. A pulse generator for reforming pulses as defined in claim 12 but further characterized by having said unilateral conducting means comprising a plurality of diodes; and
- a fifth transistor having an input electrode and an output electrode, said input electrode of said fifth transistor connected to said input electrode of said second transistor and said output electrode of said fifth transistor being connected to said emitter electrode of said fourth transistor.

14. A pulse generator for reforming pulses as defined in claim 11 but further characterized by having said unilateral conducting means comprising a first diode; and
- a second diode connected between the output of said second transistor and said emitter electrode of said fourth transistor.

References Cited
UNITED STATES PATENTS

| | | | |
|---|---|---|---|
| 3,053,994 | 9/1962 | Heijn et al. | 307—88.5 |
| 3,194,979 | 7/1965 | Toy | 307—88.5 |

ARTHUR GAUSS, *Primary Examiner.*

J. S. HEYMAN, *Assistant Examiner.*